(12) United States Patent
Kim et al.

(10) Patent No.: US 9,617,378 B2
(45) Date of Patent: Apr. 11, 2017

(54) METHOD FOR PREPARING BIODEGRADABLE POLYESTER RESIN

(71) Applicant: LOTTE FINE CHEMICAL CO., LTD., Ulsan (KR)

(72) Inventors: Ye Jin Kim, Seoul (KR); Gyung Don Kang, Daejeon (KR); Ki Chull Yoon, Gyeonggi-do (KR)

(73) Assignee: LOTTE FINE CHEMICAL CO., LTD. (KR)

( * ) Notice: Subject to any disclaimer, the term of this patent is extended or adjusted under 35 U.S.C. 154(b) by 0 days.

(21) Appl. No.: 14/915,711

(22) PCT Filed: Aug. 25, 2014

(86) PCT No.: PCT/KR2014/007885
§ 371 (c)(1),
(2) Date: Mar. 1, 2016

(87) PCT Pub. No.: WO2015/030446
PCT Pub. Date: Mar. 5, 2015

(65) Prior Publication Data
US 2016/0222158 A1    Aug. 4, 2016

(30) Foreign Application Priority Data

Sep. 2, 2013 (KR) ......................... 10-2013-0105102

(51) Int. Cl.
*C08G 63/02* (2006.01)
*C08G 63/88* (2006.01)
*C08G 63/78* (2006.01)
*C08G 63/16* (2006.01)

(52) U.S. Cl.
CPC ............. *C08G 63/88* (2013.01); *C08G 63/16* (2013.01); *C08G 63/78* (2013.01)

(58) Field of Classification Search
CPC ................................ C08G 63/88; C08G 63/16
USPC ............................................ 528/271, 272, 274
See application file for complete search history.

(56) References Cited

U.S. PATENT DOCUMENTS

| 2005/0214489 A1 | 9/2005 | Sato et al. |
| 2009/0259000 A1 | 10/2009 | Urakami et al. |
| 2012/0065342 A1 | 3/2012 | Hamaguchi et al. |

FOREIGN PATENT DOCUMENTS

| KR | 10-2005-0005493 A | 1/2005 |
| KR | 10-2005-0096602 A | 10/2005 |
| KR | 10-2006-0015284 A | 2/2006 |
| KR | 10-2007-0016918 A | 2/2007 |
| KR | 10-2009-0042820 A | 4/2009 |
| KR | 10-2012-0036856 A | 4/2012 |
| WO | 2004/104080 A1 | 12/2004 |

OTHER PUBLICATIONS

International Search Report date of mailing Dec. 17, 2014 for PCT/KR2014/007885 and English translation of the same. (4 pages).

*Primary Examiner* — Terressa Boykin
(74) *Attorney, Agent, or Firm* — Fitch Even Tabin & Flannery LLP

(57) ABSTRACT

A method of preparing a biodegradable polyester resin is provided. The method of preparing a biodegradable polyester resin includes: (a) synthesizing the biodegradable polyester resin having a reheating crystallization initiation temperature ($T_{ch1}$), a reheating crystallization peak temperature ($T_{ch}$), and a reheating crystallization end temperature ($T_{ch2}$); and (b) crystallizing the biodegradable polyester resin synthesized in step (a) by cooling the resin from a temperature of $T_1$ to a temperature of $T_2$ and then maintaining the resin at a temperature of $T_2$ for a time of $t_c$. Thus, the biodegradable polyester resin with improved solidification rate may be obtained.

8 Claims, 1 Drawing Sheet

METHOD FOR PREPARING BIODEGRADABLE POLYESTER RESIN

CROSS-REFERENCE TO RELATED APPLICATIONS

This application is a U.S. national phase application filed under 35 U.S.C. §371 of International Application PCT/KR2014/007885, filed on Aug. 25, 2014, designating the United States, which claims priority from Korean Application Number 10-2013-0105102, filed Sep. 2, 2013, which are hereby incorporated herein by reference in their entirety.

TECHNICAL FIELD

One or more embodiments of the present invention relate to a method of preparing a biodegradable polyester resin, and more particularly, to a method of preparing a biodegradable polyester resin, which produces a biodegradable polyester resin having enhanced solidification rate by including a rapid crystallization step of a biodegradable polyester resin having a reheating crystallization peak temperature ($T_{ch}$).

BACKGROUND ART

Plastic has been widely used in daily life since it is a high-functional and durable material. Conventional plastic, however, has many problems including having a low decomposition rate by microorganisms when buried, and discharging harmful gases when incinerated, thereby causing environmental pollution. Therefore, a research into a biodegradable plastic has been developed.

Among biodegradable plastics, a biodegradable polyester resin is in the spotlight. The biodegradable polyester resin refers to a polymer that can be decomposed into water and carbon dioxide, or water and methane gas by natural microorganisms such as bacteria, algae, and fungi. This biodegradable polyester resin has recently been suggested as a compelling solution to prevent pollution of the environment due to landfill or incineration.

To manufacture a molded article with the biodegradable polyester resin, the biodegradable polyester resin needs to be solidified and then pelletized since the biodegradable polyester resin generally exists in a molten state immediately after being synthesized. Thus, in the case of the biodegradable polyester such as polylactic acid (PLA), polybutylene succinate (PBS), and the like, the synthesized resin in a molten state is generally cooled using a coagulating bath or a cooling device at 10° C. or less and then pelletized. Here, the characteristics of polymers that the biodegradable polyester resin is crystallized at a cooling crystallization peak temperature ($T_{cc}$) are used, and $T_{cc}$ refers to a peak temperature of crystallization peak that appears when the resin at a high temperature is cooled at a predetermined rate in a differential scanning calorimeter (DSC).

However, after being synthesized, the biodegradable polyester resin such as polyethylene succinate (PES), polyethylene succinate-co-adipate (PESA), and the like is not solidified in a coagulating bath that maintains a temperature of 10° C. or less since they have no $T_{cc}$, or the crystallization does not occur enough when being cooled due to too low crystallizing rate thereof. Thus, these kinds of biodegradable polyester resins cannot be solidified and then pelletized when using the conventional cooling method. As a result their mass production or commercialization is difficult.

There is, however, an increasing demand for a method that allows the biodegradable polyester resin, which is hard to be solidified by the conventional methods, to be solidified, and to have an improved solidification rate so that the biodegradable polyester resin is able to be commercialized.

SUMMARY OF THE INVENTION

One or more embodiments of the present invention include a method of preparing a biodegradable polyester resin, wherein the method includes rapidly crystallizing the biodegradable polyester resin that has a reheating crystallization peak temperature ($T_{ch}$).

According to an aspect of an embodiment of the present invention, the method of preparing a biodegradable polyester resin includes:

(a) synthesizing the biodegradable polyester resin having a reheating crystallization initiation temperature ($T_{ch1}$), a reheating crystallization peak temperature ($T_{ch}$) and a reheating crystallization end temperature ($T_{ch2}$); and (b) crystallizing the resin synthesized in step (a) by cooling the resin from a temperature of $T_1$ to a temperature of $T_2$ and then maintaining the resin at a temperature of $T_2$ for a time of $t_c$, wherein $T_{ch1}$, $T_{ch}$, and $T_{ch2}$ respectively denote an initial temperature, a peak temperature, and a final temperature of the crystallization peak that appears in a second step after a first step, wherein, in the first step, the molten resin synthesized in step (a) is cooled at a cooling rate of about 10° C./min from about 200° C. to about −50° C., and then in the second step, the cooled resin is heated at a heating rate of 10° C./min from about −50° C. to about 200° C., in a differential scanning calorimeter (DSC); $T_1$ is a temperature between about 220° C. and about 280° C.; and $T_2$ satisfies the condition of $T_{ch1} \leq T_2 \leq T_{ch2}$.

$T_2$ may be the temperature between about 15° C. and about 80° C.

$t_c$ may be 5 minutes or less.

The biodegradable polyester resin may be poly(ethylene succinate) (PES) or poly(ethylene succinate-co-adipate) (PESA).

The biodegradable polyester resin may be synthesized by using ethylene glycol in an amount of from about 1 to about 2 parts by mole based on 1 part by mole of the total amount of succinic acid and adipic acid.

In a case in which the biodegradable polyester resin is PESA, the amount of the succinic acid used and the amount of the adipic acid used may be from about 80 to 99.9 parts by mole and about 0.1 to 20 parts by mole, respectively, based on 100 parts by mole of the total amount of the succinic acid and the adipic acid used.

At least one nucleating agent selected from a polymer nucleating agent including polyethylene (PE), polypropylene (PP), polyethylene terephthalate (PET) or a combination thereof; an organic nucleating agent including sodium stearate, ethylene bis-stearamide (EBS) or a combination thereof; and an inorganic nucleating agent including $TiO_2$, carbon black, clay, talc, mica, or a combination thereof may be added in step (a).

The nucleating agent may be added in an amount of about 0.1 wt % to about 5 wt % based on the total weight of the biodegradable polyester resin.

According to the method of preparing a biodegradable polyester resin of an embodiment of the present invention, the biodegradable polyester resin with an improved solidification rate may be obtained by including the rapid crystallizing of the biodegradable polyester resin having $T_{ch}$.

DETAILED DESCRIPTION OF THE PREFERRED EMBODIMENTS

Hereinafter, a method of preparing a biodegradable polyester resin according to an embodiment of the present invention is described in detail.

The term "polyester" used herein refers to a synthetic polymer prepared by a esterification reaction and a polycondensation reaction of one or more di- or multi-functional carboxylic acids and one or more di- or multi-functional hydroxyl compounds.

The term "crystallization temperature ($T_c$)" used herein refers to a temperature which is lower than a melting temperature ($T_m$) and is equal to or greater than a glass transition temperature ($T_g$), and at which the chains of resin in an amorphous state or a molten state form an area at least partially aligned. $T_c$ may be classified into a cooling crystallization peak temperature ($T_{cc}$) or a reheating crystallization peak temperature ($T_{ch}$).

Figure 1:
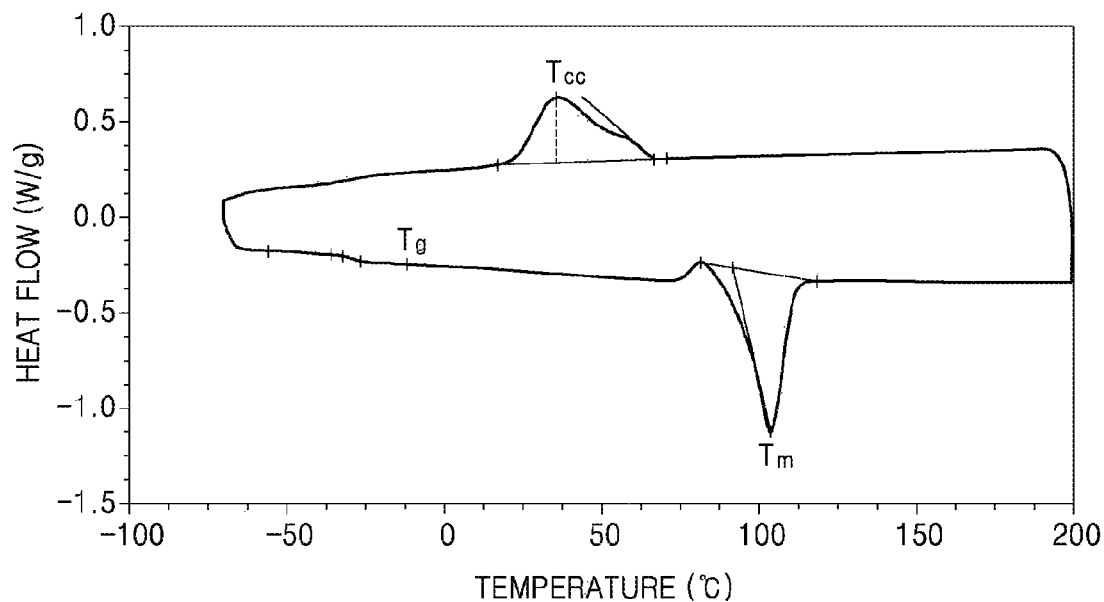
FIG. 1 shows a DSC curve of a biodegradable polyester resin having a cooling crystallization peak temperature ($T_{cc}$)

$T_{cc}$ used herein refers to a temperature at which a molten resin emits maximum amount of heat when being cooled, and a peak temperature of crystallization peak that appears in a second step after a first step, wherein, in the first step, room-temperature resin (20° C.) is preheated at a heating rate of about 10° C./min up to 200° C., and then in the second step, the preheated resin is cooled at a cooling rate of about 10° C./min from about 200° C. to about –50° C., in a differential scanning calorimeter (DSC). $T_{cc}$ refers to a crystallization temperature in the general sense. $T_{cc}$ is shown together with $T_g$ and $T_m$ in FIG. 1.

Figure 2:
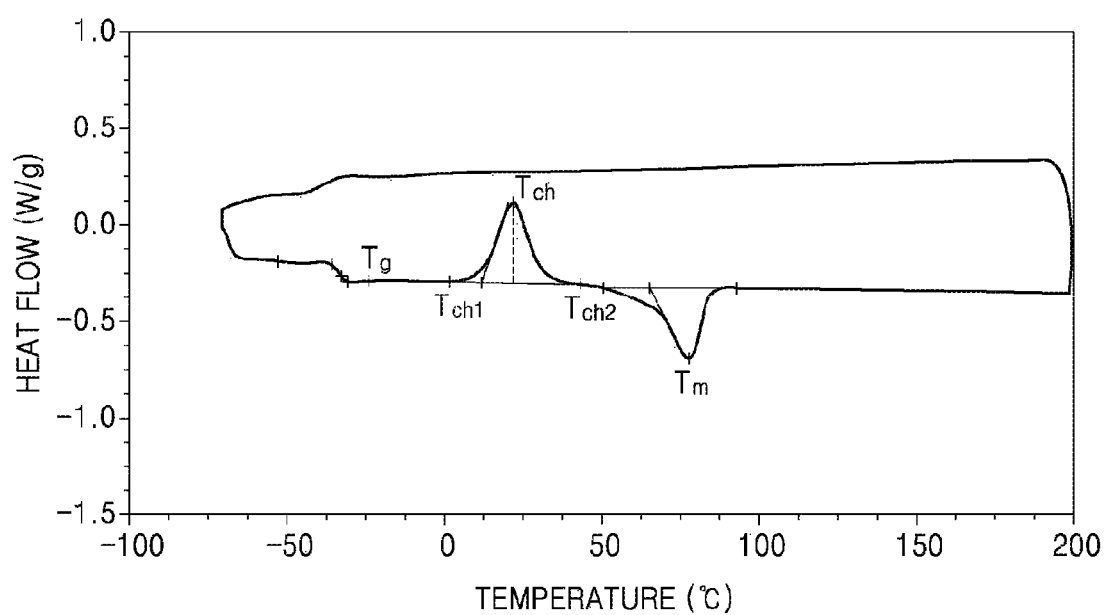
FIG. 2 shows a DSC curve of a biodegradable polyester resin having a reheating crystallization peak temperature ($T_{ch}$).

$T_{ch}$ used herein refers to a temperature at which a resin at a low temperature (about –50⌊) emits maximum amount of heat when being heated, and a peak temperature of crystallization peak that appears in a second step after a first step, wherein, in the first step, a molten resin is cooled at a cooling rate of about 10° C./min from about 200° C. to about –50° C., and in the second step, the cooled resin is heated at a heating rate of about 10° C./min from about –50° C. to about 200° C., in a DSC. The molten resin may be obtained by preheating room-temperature resin (20° C.) at a heating rate of about 10° C./min up to about 200° C. in a DSC. $T_{ch}$ is shown together with $T_g$ and $T_m$ in FIG. 2. Also, $T_{ch1}$ and $T_{ch2}$ in FIG. 2 refer to a reheating crystallization initiation temperature and a reheating crystallization end temperature, that will be explained later respectively.

The method of preparing the biodegradable polyester resin, according to an embodiment of the present invention includes: (a) synthesizing a biodegradable polyester resin having $T_{ch1}$, $T_{ch}$, and $T_{ch2}$; and (b) crystallizing the resin synthesized in step (a) by cooling the resin from a temperature of $T_1$ to a temperature of $T_2$ and then maintaining the resin at a temperature of $T_2$ for a time of $t_c$, $T_{ch1}$, $T_{ch}$, and $T_{ch2}$ respectively denote an initiation temperature, a peak temperature, and an end temperature of the crystallization peak that appears in a second step after a first step, wherein, in the first step, the molten resin synthesized in step (a) is cooled at a cooling rate of about 10° C./min from about 200° C. to about –50° C., and in the second step, the cooled resin is heated at a heating rate of about 10° C./min from about –50° C. to about 200° C., in a DSC. Therefore, $T_{ch1}$, $T_{ch}$, and $T_{ch2}$ are intrinsic properties of the biodegradable polyester resin that varies depending on a composition, a molecular weight, and/or a chemical structure of the biodegradable polyester resin.

In step (b), a cooling rate may be 10° C./min or more, for example, between about 10° C./min and about 200° C./min.

$T_1$ is a temperature between about 220° C. and about 280° C.

$T_2$ satisfies the condition of $T_{ch1} \leq T_2 \leq T_{ch2}$.

$t_c$ may be 5 minutes or less, for example, 1 minute or less. In other words, the biodegradable polyester resin synthesized in step (a) is crystallized in step (b) in a short time. Accordingly, the solidification rate of the biodegradable polyester resin synthesized in step (a) is improved.

The synthesizing of the biodegradable polyester resin may include an esterification reaction and a subsequent polycondensation reaction of a dicarboxylic acid compound and a diol compound. The esterification reaction produces an oligomer and the polycondensation reaction produces a polymer from the oligomer.

The dicarboxylic acid compound may include: an aliphatic dicarboxylic acid compound such as succinic acid and adipic acid; ester derivatives, acyl halide derivatives, and anhydride derivatives of the aliphatic dicarboxylic acid compound; or a combination thereof. The diol compound may include ethylene glycol, trimethylene glycol, tetramethylene glycol, pentamethylene glycol, hexamethylene glycol, diethylene glycol, triethylene glycol, or a combination thereof.

When the dicarboxylic acid compound is succinic acid and the diol compound is ethylene glycol, the biodegradable polyester resin may be a poly(ethylene succinate) (PES) whereas when the dicarboxylic acid compound is succinic acid and adipic acid, and the diol compound is ethylene glycol, the biodegradable polyester resin may be a poly(ethylene succinate-co-adipate) (PESA).

The dicarboxylic acid compound and the diol compound may react to form an ester bond by the esterification reaction, and the biodegradable polyester resin may be synthesized by using ethylene glycol in the amount of from about 1 to about 2 parts by mole based on 1 part by mole of the total amount of the succinic acid and the adipic acid in the esterification reaction.

If the amount of ethylene glycol used is within the aforementioned range, the succinic acid and the adipic acid react completely; a depolymerization, by which the ester bondis borken and is caused by an acidolysis reaction resulting from residual succinic acid and adipic acid, less likely occurs; and the cost increase due to excessive use of ethylene glycol can be prevented.

When the biodegradable polyester resin is PESA, the amount of the succinic acid used and the amount of the adipic acid used in the esterification reaction may be from 80 parts by mole to about 99.9 parts by mole, and from about 0.1 part by mole to about 20 parts by mole, respectively, based on 100 parts by mole of the total amount of the succinic acid and the adipic acid used. If each amount of the succinic acid and the adipic acid used is within the aforementioned range, the PESA may have $T_{ch}$.

An end point of the esterification reaction may be determined by measuring the amount of water produced as a by-product in this reaction. For example, when succinic acid and adipic acid are used as the dicarboxylic acid compound in amounts of about 0.95 mol and about 0.05 mol respectively, and ethylene glycol is used as the diol compound in an amount of about 1.3 mol, the esterification reaction may be ended when the amount of water produced in the reaction reaches to 90% or more (i.e. about 1.8 mol or more) of about 2 mol of water to be generated as a by-product as it is assumed that all the amount of the succinic acid and the adipic acid used react with ethylene glycol.

The esterification reaction may be performed at a temperature of from about 160° C. to about 200° C. and under normal pressure. The term "normal pressure" used herein refers to the pressure in a range of from about 750 torr to about 770 torr.

To facilitate the esterification reaction, a catalyst, a thermal stabilizer, a branching agent and/or a color control agent may be further added thereto.

Examples of the catalyst may include magnesium acetate, tin (II) acetate, tetra-n-butyl titanate (TBT), lead acetate, sodium acetate, potassium acetate, antimony trioxide, N,N-dimethylaminopyridine, N-methylimidazole, or a combination thereof. The catalyst is generally added together with a monomer when the monomer is added. For example, the amount of the catalyst used may be from about 0.00001 part by mole to about 0.2 part by mole based on 1 part by mole of the amount of the dicarboxylic acid compound used.

The thermal stabilizer may be an organic or inorganic phosphorus compound. Examples of the organic or inorganic phosphorus compound may include phosphoric acid and organic ester thereof, and phosphorous acid and organic ester thereof. Examples of the thermal stabilizer may also include commercially available materials such as phosphoric acid, alkyl or aryl phosphate compound, or a combination thereof. For example, the thermal stabilizer may be triphenyl phosphate (TPP). For example, when the catalyst and the thermal stabilizer are used together, the amount of the thermal stabilizer used herein may be from about 0.00001 part by mole to about 0.2 part by mole based on 1 part by mole of the amount of the dicarboxylic acid compound used.

The branching agent is used to control biodegradability or physical properties of the polyester resin. As the branching agent, a compound that has three or more groups capable of forming an ester or amide, selected from a carboxyl group, a hydroxyl group, and an amine group, may be used. Specifically, as the branching agent, trimellitic acid, citric acid, maleic acid, glycerol, monosaccharides, disaccharides, dextrin, or reduced sugar may be used. The amount of the branching agent used herein may be from about 0.00001 part by mole to about 0.2 part by mole based on 1 part by mole of the aliphatic dicarboxyl acid.

The color control agent is an additive to control chromaticity of the biodegradable polyester resin. Examples of the color control agent may include cobalt acetate (CA). The color control agent may be used together with an aliphatic diol and an aliphatic dicarboxylic acid in the esterification reaction and may also be used in the polycondensation reaction that will be described later. The amount of the color control agent used herein may be from about 0.00001 part by mole to about 0.2 part by mole based on about 1 part by mole of the aliphatic dicarboxyl acid.

To further increase the solidification rate of the biodegradable polyester resin, a nucleating agent may be added to at least one reaction of the esterification reaction and the subsequent polycondensation reaction. The nucleating agent added may facilitate nucleation and thus may improve the crystallinity of the resin.

For example, at least one nucleating agent selected from a polymer nucleating agent including polyethylene (PE), polypropylene (PP), polyethylene terephthalate (PET), or a combination thereof; an organic nucleating agent including sodium stearate, ethylene bis-stearamide (EBS), or a combination thereof; and an inorganic nucleating agent including $TiO_2$, carbon black, clay, talc, mica, or a combination thereof may be added in step (a).

The nucleating agent may be added in an amount of about 0.1 wt % to about 5 wt % based on the total weight of the biodegradable polyester resin. When the added amount of the nucleating agent is within the aforementioned range, the nucleating agent may facilitate nucleation without participating in the polycondensation reaction and affecting the intrinsic properties of the resin.

To increase the rate of the reaction by shifting the chemical equilibrium in the esterification reaction, the by-product water and/or the unreacted diol compound may be discharged out of this reaction system through evaporation and distillation.

The product (i.e., oligomer) of the esterification reaction may further undergo condensation polymerization for polymerization. The polycondensation reaction may be performed in a temperature range of about 220° C. to about 280° C. for about 90 minutes to about 300 minutes. For example, when ethylene glycol is used as the diol compound, the polycondensation reaction may be performed in a temperature range of about 250° C. to about 280° C. for about 90 minutes to about 180 minutes.

The polycondensation reaction may be performed under a pressure of 1 torr or less. By performing the polycondensation reaction under vacuum pressure, a biodegradable polyester resin having a high molecular weight may be obtained while an unreacted raw material (an unreacted monomer), a low molecular weight oligomer, and by-product water are removed. Here, after the completion of the polycondensation reaction, the resin may have a temperature of $T_1$, and $T_1$ may be from about 220° C. to about 280° C.

The biodegradable polyester resin synthesized in step (a) by the esterification reaction, and the subsequent polycondensation reaction may be rapidly solidified and then pelletized by being cooled in step (b).

When the biodegradable polyester resin is PES or PESA, $T_2$ may be in a range of about 15° C. to about 80° C.

The cooling may be performed by using a cooling device such as a coagulating bath.

One or more embodiments of the present invention will be described in greater detail with reference to examples, but the present invention is not limited thereto.

EXAMPLES

Examples 1~2 and Comparative Example 1

Preparation of PES (Esterification Reaction)

Ethylene glycol (EG), succinic acid (SA), tetra-n-butyl titanate (TBT), and malic acid (MA) in amounts shown in Table 1 below were loaded into a 500 ml 3-neck round bottom flask equipped with a condenser, a nitrogen inlet, and a stirrer to prepare a mixture. Then, the mixture was heated to the esterification reaction temperature shown in Table 2 and reacted while stirring in a nitrogen atmosphere until the amount of water shown in Table 2 was discharged. Here, the produced water was completely discharged out of this system through the condenser, and then triphenyl phosphate (TPP) and cobalt acetate (CA) (5 wt % in ethylene glycol) in amounts shown in Table 1 were added to the 3-neck round bottom flask and stirred for about 5 minutes.

(Polycondensation Reaction)

Subsequently, the 3-neck round bottom flask was heated up to the polycondensation reaction temperature shown in Table 2 under a vacuum of 1 torr or less and then the reaction was conducted for the polycondensation reaction time shown in Table 2. Then, the content of the flask were discharged into a coagulating bath that maintained the temperature shown in Table 2. As a result, PES was obtained.

Examples 3~7 and Comparative Examples 2~3

Preparation of PESA (Esterification Reaction)

EG, SA, adipic acid (AA), TBT, and MA in amounts shown in Table 1 below were loaded into a 500 ml 3-neck round bottom flask equipped with a condenser, a nitrogen inlet, and a stirrer to prepare a mixture. Then, the mixture is heated to the esterification reaction temperature shown in Table 2 and reacted while stirring in a nitrogen atmosphere until the amount of water shown in Table 2 was discharged. Here, the produced water was discharged completely out of this system through the condenser, and then TPP, CA (5 wt % in ethylene glycol), and a nucleating agent in amounts shown in Table 1 were added to the 3-neck round bottom flask and stirred for about 5 minutes.

(Poly Condensation Reaction)

Subsequently, the 3-neck round bottom flask was heated up to the polycondensation reaction temperature shown in Table 2 under a vacuum of 1 torr or less, and then the reaction was conducted for the polycondensation reaction time shown in Table 2. Then, the content of the flask were discharged into a coagulating bath that maintained the temperature shown in Table 2. As a result, PESA was obtained.

The amounts of monomers and additives used in each example are shown in Table 1 below. The conditions of the esterification reaction and the polycondensation reaction, and the temperature of the coagulating bath at the time of discharging the content of the flask are shown in Table 2 below.

TABLE 1

| | EG (g(mol)) | SA (g(mol)) | AA (g(mol)) | TBT (g(mmol)) | MA (g(mmol)) | TPP (g(mmol)) | CA (g(mmol)) | nucleating agent PE (g) | nucleating agent EBS (g) |
|---|---|---|---|---|---|---|---|---|---|
| Example 1 | 124.14 (2.0) | 118.09 (1.0) | 0 (0) | 0.15 (0.44) | 0.1 (0.75) | 1.5 (4.60) | 1.5 (0.30) | 0 | 0 |
| Example 2 | 124.14 (2.0) | 118.09 (1.0) | 0 (0) | 0.15 (0.44) | 0.1 (0.75) | 1.5 (4.60) | 1.5 (0.30) | 0 | 0 |
| Example 3 | 124.14 (2.0) | 112.18 (0.95) | 7.31 (0.05) | 0.15 (0.44) | 0.1 (0.75) | 1.5 (4.60) | 1.5 (0.30) | 0 | 0 |
| Example 4 | 124.14 (2.0) | 112.18 (0.95) | 7.31 (0.05) | 0.15 (0.44) | 0.1 (0.75) | 1.5 (4.60) | 1.5 (0.30) | 0 | 0 |
| Example 5 | 124.14 (2.0) | 112.18 (0.95) | 7.31 (0.05) | 0.15 (0.44) | 0.1 (0.75) | 1.5 (4.60) | 1.5 (0.30) | 2.0 | 0 |
| Example 6 | 124.14 (2.0) | 112.18 (0.95) | 7.31 (0.05) | 0.15 (0.44) | 0.1 (0.75) | 1.5 (4.60) | 1.5 (0.30) | 0 | 2.0 |
| Example 7 | 124.14 (2.0) | 106.28 (0.90) | 14.62 (0.10) | 0.15 (0.44) | 0.1 (0.75) | 1.5 (4.60) | 1.5 (0.30) | 2.0 | 0 |
| Comparative Example 1 | 124.14 (2.0) | 118.09 (1.0) | 0 (0) | 0.15 (0.44) | 0.1 (0.75) | 1.5 (4.60) | 1.5 (0.30) | 0 | 0 |
| Comparative Example 2 | 124.14 (2.0) | 112.18 (0.95) | 7.31 (0.05) | 0.15 (0.44) | 0.1 (0.75) | 1.5 (4.60) | 1.5 (0.30) | 0 | 0 |
| Comparative Example 3 | 124.14 (2.0) | 106.28 (0.90) | 14.62 (0.10) | 0.15 (0.44) | 0.1 (0.75) | 1.5 (4.60) | 1.5 (0.30) | 0 | 0 |

TABLE 2

| | esterification reaction temperature (° C.) | discharged water during esterification reaction (ml) | polycondensation reaction temperature (° C.) | polycondensation reaction time (mins) | temperature of coagulating bath (° C.) |
|---|---|---|---|---|---|
| Example 1 | 180 | 30 | 280 | 116 | 30 |
| Example 2 | 180 | 30 | 280 | 125 | 70 |
| Example 3 | 180 | 31 | 280 | 123 | 35 |
| Example 4 | 180 | 30 | 280 | 132 | 60 |
| Example 5 | 180 | 31 | 280 | 117 | 35 |
| Example 6 | 180 | 29 | 280 | 144 | 35 |
| Example 7 | 180 | 30 | 280 | 129 | 35 |
| Comparative Example 1 | 180 | 29 | 280 | 118 | 4 |

TABLE 2-continued

| | esterification reaction temperature (° C.) | discharged water during esterification reaction (ml) | polycondensation reaction temperature (° C.) | polycondensation reaction time (mins) | temperature of coagulating bath (° C.) |
|---|---|---|---|---|---|
| Comparative Example 2 | 180 | 31 | 280 | 122 | 85 |
| Comparative Example 3 | 180 | 29 | 280 | 115 | 35 |

Evaluation Example $T_g$, $T_m$, $T_{ch1}$, $T_{ch}$, $T_{ch2}$, and $t_c$ of PES or PESA synthesized in Examples 1-7 and Comparative Examples 1-3 were measured by the method below, and the results thereof are shown in Table 3 below.

<Measurement of $T_g$, $T_m$, $T_{ch1}$, $T_{ch}$, and $T_{ch2}$>

Using a DSC (Q2000, manufactured by TA Instruments), the temperatures were measured by preheating room temperature (20° C.) PES or PESA synthesized in Examples 1 to 7 and Comparative Examples 1 to 3 at a heating rate of about 10° C./min up to about 200° C.; cooling the preheated PES or PESA at a cooling rate of about 10° C./min from about 200° C. to about −50° C.; and reheating the cooled PES or PESA at a heating rate of about 10° C./min from about −50° C. to about 200° C.

<Measurement of a Solidification Time $t_c$>

PES or PESA synthesized in Examples 1 to 7 and Comparative Examples 1 to 3 were discharged into a corresponding coagulating bath, and then, a time taken for the transparent resin (i.e., resin in a molten state) to become a white resin (i.e., resin in crystallized state) in the coagulating bath was measured with the naked eyes. This measured time was recorded as a solidification time $t_c$. Results thereof are shown in Table 3 below.

TABLE 3

| | $T_g$ (° C.) | $T_m$ (° C.) | $T_{cc}$ (° C.) | $T_{ch1}$ (° C.) | $T_{ch}$ (° C.) | $T_{ch2}$ (° C.) | $t_c$ (secs) |
|---|---|---|---|---|---|---|---|
| Example 1 | −9.29 | 100.64 | — | 28.74 | 60.29 | 78.17 | 58 |
| Example 2 | −9.29 | 100.64 | — | 28.74 | 60.29 | 78.17 | 26 |
| Example 3 | −11.84 | 93.90 | — | 33.26 | 53.69 | 79.22 | 52 |
| Example 4 | −11.84 | 93.90 | — | 33.26 | 53.69 | 79.22 | 33 |
| Example 5 | −13.99 | 90.71 | 66.3 | 29.25 | 49.12 | 72.50 | 33 |
| Example 6 | −11.21 | 95.72 | 31.11 | 16.60 | 40.23 | 62.50 | 28 |
| Example 7 | −13.14 | 85.41 | 66.77 | 34.02 | 58.01 | 74.50 | 48 |
| Comparartive Example 1 | −9.29 | 100.64 | — | 28.74 | 60.29 | 78.17 | no solidification |
| Comparartive Example 2 | −11.84 | 93.90 | — | 33.26 | 53.69 | 79.22 | no solidification |
| Comparative Example 3 | −13.50 | — | — | — | — | — | no solidification |

Referring to Table 3, the biodegradable polyester resins prepared in Examples 1 to 7 were solidified in a short time of 1 minute or less, whereas the biodegradable polyester resins prepared in Comparative Examples 1 to 3 were not solidified and remained in a molten state. Also, the biodegradable polyester resins prepared in Examples 5 and 6 using the nucleating agent had a shorter solidification time $t_c$ than the biodegradable polyester resins prepared in Examples 3 and 4 without using the nucleating agent, respectively, provided that the types of the prepared resins are identical. Also, comparison results of the biodegradable polyester resin prepared in Example 7 and the biodegradable polyester resin prepared in Comparative Example 3 show that whether or not each biodegradable polyester resin is solidified depends on the addition of the nucleating agent.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A method of preparing a biodegradable polyester resin, the method comprising:
(a) synthesizing the biodegradable polyester resin having a reheating crystallization initiation temperature ($T_{ch1}$), a reheating crystallization peak temperature ($T_{ch}$), and a reheating crystallization end temperature ($T_{ch2}$); and
(b) crystallizing the biodegradable polyester resin synthesized in step (a) by cooling the biodegradable polyester resin from a temperature of $T_1$ to a temperature of $T_2$ and then maintaining the biodegradable polyester resin at a temperature of $T_2$ for a time of $t_c$,
wherein $T_{ch1}$, $T_{ch}$, and $T_{ch2}$ respectively denote an initial temperature, a peak temperature, and a final temperature of the crystallization peak that appears in a second step after a first step, wherein, in the first step, the molten biodegradable polyester resin synthesized in step (a) is cooled at a cooling rate of about 10° C./min from about 200° C. to about −50° C., and in the second step, the cooled biodegradable polyester resin is heated at a heating rate of about 10° C./min from about −50° C. to about 200° C., in a differential scanning calorimeter (DSC), $T_1$ is a temperature between about 220° C. and about 280° C., and $T_2$ satisfies the condition of $T_{ch1} \leq T_2 \leq T_{ch2}$.

2. The method of claim 1, wherein $T_2$ is a temperature between about 15° C. and about 80° C.

3. The method of claim 1, wherein $t_c$ is 5 minutes or less.

4. The method of claim 1, wherein the biodegradable polyester resin is poly(ethylene succinate) (PES) or poly(ethylene succinate-co-adipate) (PESA).

5. The method of claim 4, wherein the biodegradable polyester resin is synthesized by using ethylene glycol in an amount of from about 1 part by mole to about 2 parts by mole based on 1 part by mole of the total amount of succinic acid and adipic acid.

6. The method of claim 4, wherein when the biodegradable polyester resin is PESA, the amount of the succinic acid used and the amount of the adipic acid used are from about 80 parts by mole to about 99.9 parts by mole and from about 0.1 part by mole to about 20 parts by mole, respectively, based on 100 parts by mole of the total amount of the succinic acid and the adipic acid used.

7. The method of claim 1, wherein at least one nucleating agent selected from a polymer nucleating agent including polyethylene (PE), polypropylene (PP), polyethylene terephthalate (PET), or a combination thereof; an organic nucleating agent including sodium stearate, ethylene bis-stearamide (EBS), or a combination thereof; and an inorganic nucleating agent including $TiO_2$, carbon black, clay, talc, mica, or a combination thereof is added in step (a).

8. The method of claim 7, wherein the nucleating agent is added in an amount of about 0.1 wt % to about 5 wt % based on the total weight of the biodegradable polyester resin.

* * * * *